June 12, 1923.
E. G. McCAULEY
1,458,214
SYNCHRONIZING CONTROL MECHANISM FOR REVERSIBLE PITCH PROPELLERS
Filed Aug. 30, 1921    5 Sheets-Sheet 1
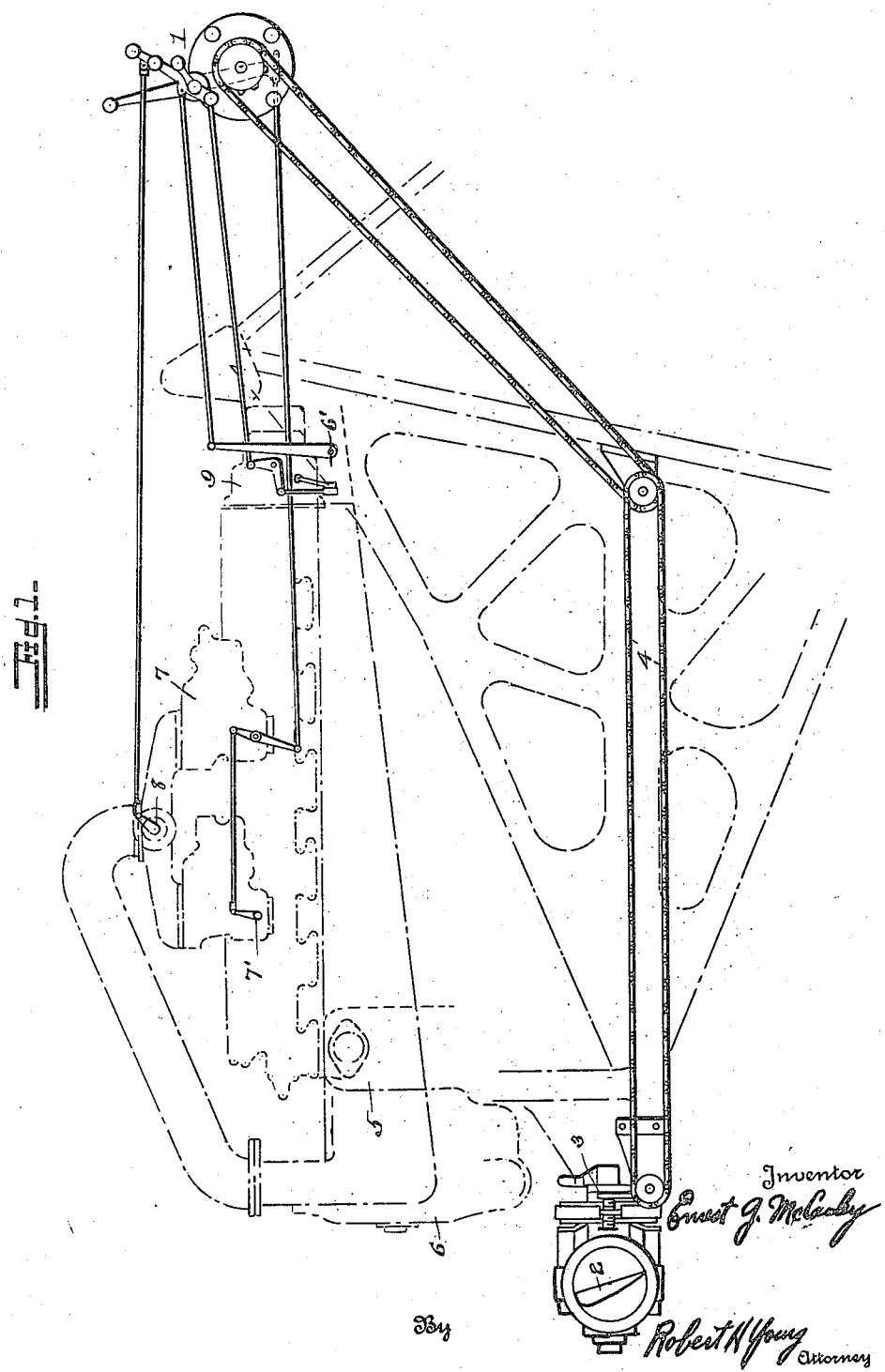

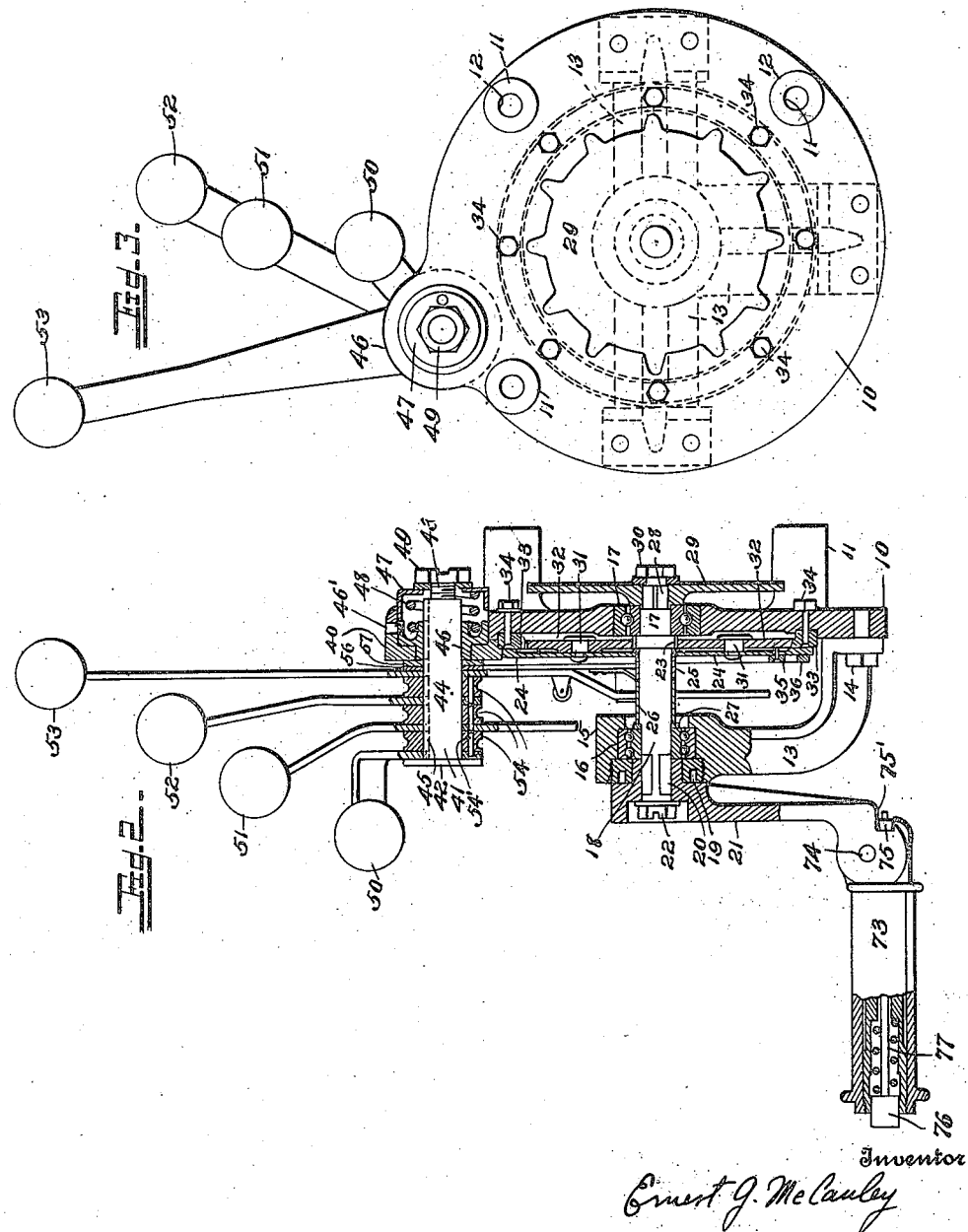

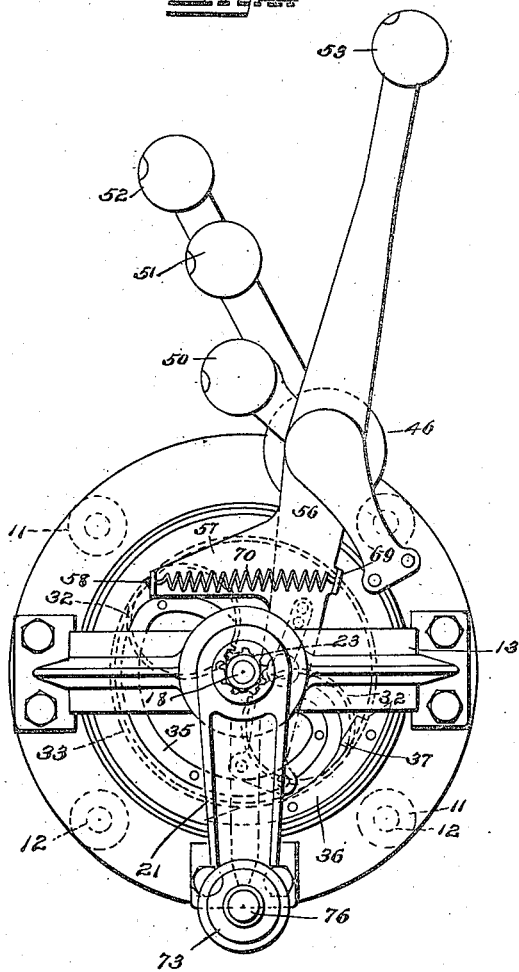

June 12, 1923. 1,458,214
E. G. McCAULEY
SYNCHRONIZING CONTROL MECHANISM FOR REVERSIBLE PITCH PROPELLERS
Filed Aug. 30, 1921 5 Sheets-Sheet 4
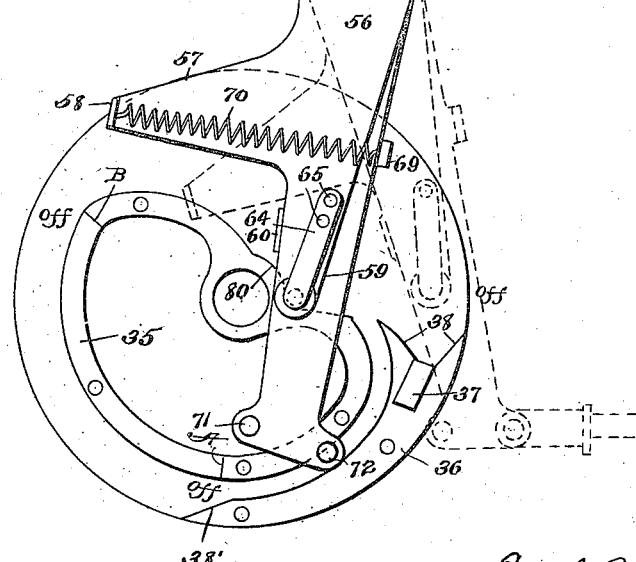

June 12, 1923.
E. G. McCAULEY
1,458,214
SYNCHRONIZING CONTROL MECHANISM FOR REVERSIBLE PITCH PROPELLERS
Filed Aug. 30 1921
5 Sheets—Sheet 5
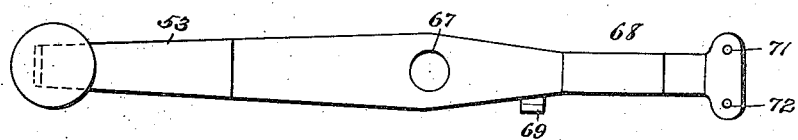
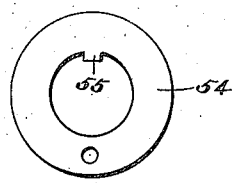
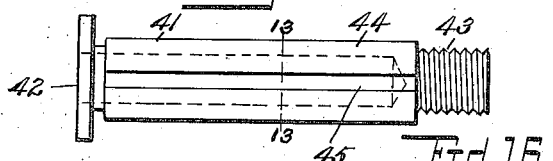
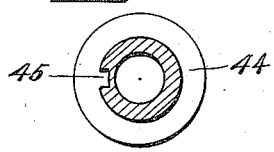
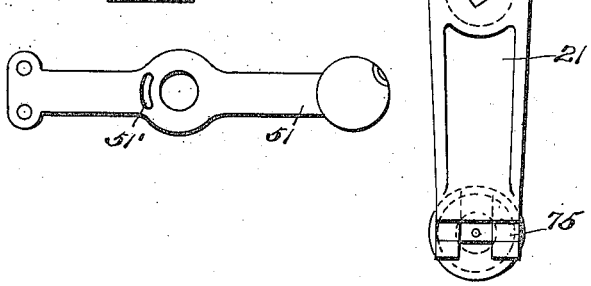
Inventor
Ernest G. McCauley
By
Robert H. Young  Attorney Patented June 12, 1923.

1,458,214

UNITED STATES PATENT OFFICE.

ERNEST G. McCAULEY, OF DAYTON, OHIO.

SYNCHRONIZING CONTROL MECHANISM FOR REVERSIBLE-PITCH PROPELLERS.

Application filed August 30, 1921. Serial No. 497,056. REISSUED

*To all whom it may concern:*

Be it known that I, ERNEST G. MCCAULEY, a citizen of the United States, residing at Dayton, in the county of Montgomery and State of Ohio, have invented certain new and useful Improvements in Synchronizing Control Mechanism for Reversible-Pitch Propellers, of which the following is a specification.

This invention relates to control mechanism for reversible pitch propellers and is adapted more particularly to be used in connection with propeller blades of an airplane.

The primary object of the invention is to synchronize the engine speed in relation to the pitch of the propeller blades to prevent the engine from speeding up or racing when the propeller blades are being changed through the position of mean pitch. For this purpose the control mechanism embodies devices for automatically moving the throttle valve of the engine to idling position while the propeller blades are passing through this position of mean pitch. The throttle valve is also automatically moved to positions between the idling and maximum open condition in synchronism with the existing angularity of the propeller blades.

In order that the throttle valve may be moved to "off" position at any time in order to reduce the engine speed, a compensating arrangement is provided which permits manual control of the throttle valve independently of other parts of the mechanism.

According to my invention the control mechanism is mounted on a bracket located within convenient reach of the pilot and this bracket also serves as a mounting for a plurality of control levers, thereby affording a compact arrangement which will occupy a small space in the cockpit of the airplane. In order that my invention may be fully understood, I have illustrated in the accompanying drawings and will proceed to describe a practical embodiment thereof, with the understanding, however, that the same may be variously modified without substantially departing from the spirit and scope of my invention.

Other objects of the invention, including novel features of construction and arrangements of parts, will become apparent as the description proceeds.

In the drawings, similar reference characters refer to similar parts in all the views. The figures of the drawings may be identified as follows:

Figure 1 is a diagrammatic view of the control mechanism in assembled relation.

Figure 2 is a central vertical section through the control bracket.

Figure 3 is a rear elevation of the assembled mechanism.

Figure 4 is a front elevation of the assembled mechanism.

Figure 5 is a detail side elevation of the compensating lever.

Figure 6 is an edge view of said lever.

Figure 7 is a side elevation of the cam disc and cam guide, and

Figure 8 is an edge view of the same.

Figure 9 is a side elevation of the throttle lever, and

Figure 10 is an edge view of the same.

Figure 11 is a side elevation of a spacing disc, and

Figure 12 is a central vertical section of the same.

Figure 13 is a plan view of the control lever stud.

Figure 14 is a sectional view on the line 13—13 of Figure 12.

Figure 15 is a detail view of the spark lever.

Figure 16 is a side elevation of the operating lever and folding handle.

Referring to Figure 1, the numeral 1 designates the control mechanism constituting the subject matter of this invention. The propeller 2 has the reversing mechanism 3 associated therewith. The reversing mechanism 3 is connected to the control 1 by means of the transmitting devices 4, herein shown as sprockets and chains. The engine 5 of the aircraft is provided with a supercharger 6 controlled by a valve 6'. The carbureter 7 is controlled by means of the throttle valve 7' and mixture adjusting valve 8. The ignition devices 9 of the engine are adjustable for varying the timing of the spark. The supercharger valve 6', throttle valve 7', mixture adjusting valve 8, and spark timing devices 9 are connected by suitable levers and links to the control mechanism 1.

The numeral 10 designates a supporting bracket having projecting from its rear surface a plurality of bosses 11 which are bored and threaded as at 12 for receiving suitable fastening devices or attaching the bracket to some convenient part of an airplane such as a longeron of the fuselage. The bracket includes a three armed spider 13 adapted to be secured thereto by means of the bolt 14 and this spider is provided with a hub 15 which is arranged in spaced relation to the rear portion of the bracket 10. The hub 15 and the rear portion of the bracket in transverse alignment therewith are suitably bored for receiving the ball bearings 16 and 17, respectively. In these bearings an operating shaft 18 is rotatably mounted. The ball bearing 16 is retained in place by a rear flange on the hub 15 and by a detachable collar 19 which has screw threaded engagement with the forward portion of said hub. The forward end of the operating shaft beyond the ball bearing 16 is threaded and provided with polygonal surfaces 20 which terminate adjacent to the threaded end. An operating lever 21 is provided with a polygonal recess adapted to engage the portion 20 of the operating shaft and a nut 22, engaging the threaded end of the shaft, normally holds the operating lever in operative position whereby the shaft may be turned in either direction in accordance with the movements of the lever.

A pinion 23 is cut upon the shaft or otherwise secured thereto adjacent to the ball bearing 17. A cam disc 24 has a bushing 25 pressed into a central opening in the disc and this bushing is rotatably mounted upon the shaft 18 adjacent to the pinion 23. Between the bushing 25 and ball bearing 16 a spacer 26 and washer 27 are placed for the purpose of eliminating excessive play in the parts mounted on the shaft between the pinion 23 and the ball bearing 16. The rear end of the shaft 18 is also threaded and provided with polygonal surfaces 28 adjacent to the threaded end. A sprocket wheel 29 having corresponding polygonal recesses is mounted upon the shaft at 28 and is secured in position by means of a nut 30 which engages the rear threaded end of the shaft. This sprocket wheel 29 is engaged by a chain which connects with the reversing mechanism for the propeller blades.

The cam disc 24 carries a plurality of pivot pins 31 upon which are rotatably mounted idler gears 32 which mesh with the pinion 23 and with a stationary internal gear 33 supported upon the bracket 10 by means of suitable fastening devices 34. The cam disc has riveted thereto a cam 35 which projects from the forward surface thereof in spaced relation to a cam guide 36 also riveted to the cam disc. The cam guide 36 extends along part of the length of the cam and is formed at one end with an upwardly inclined surface 37 and inwardly inclined surface 38 and at the other end with a cam surface 38' for a purpose which will hereinafter appear.

Near the upper end of the supporting bracket 10 a hollow boss 40 is provided in which is mounted a control lever stud 41. This stud is formed at one end with a head 42, at the other end with screw threads 43 and intermediately it has a cylindrical body 44 having a keyway 45 cut therein. A double flanged collar 46 has one flange thereof inserted between the stud 41 and the boss 40 and a second flanged collar 47 is mounted near the threaded end of said stud. The collar 46 is retained from rotation by means of a pin 46' which passes through the boss 40 and the outer flange of said collar. The collar 46 is also provided with a key which engages keyway 45 and thus retains stud 41 from rotation. A coil spring 48 is maintained in compression between said collars by means of the nut 49 which engages the threaded end of the stud. A plurality of control levers 50, 51, 52, and 53, for controlling, respectively, the supercharger, the spark, the carbureter attachment for altitude and the throttle valve, are rotatably mounted in spaced relation upon the stud 41. These levers are maintained in spaced relation by spacing or friction discs 54 interposed between adjacent levers and these discs are keyed to the stud by means of the key 55.

A compensating lever 56 is also mounted on the stud 41 immediately adjacent to the throttle lever 53 and a washer 57 is interposed between the compensating lever and the bracket 10. The head 42 of the stud is adapted to abut against the outermost lever and exert a pressure on the levers in accordance with the tension of the spring 48 which, of course, is adjustable by means of the nut 49. By reason of this construction the levers will retain the position to which they are adjusted and are not likely to be moved by vibration incident to the operation of the engine or propeller of the aircraft. The friction discs 54 are formed with apertures which contain stop pins 54'. The control levers have elongated slots similar to the slot 51' of the spark lever 51 in which the ends of adjacent pins 54' are inserted for limiting the motion of the levers on the stud.

The compensating lever 56 is shown in detail in Figures 5 and 6 and is formed with a laterally projecting arm 57 having an upstanding lug 58 at one end, and with a downwardly projecting arm 59 having an upwardly projecting lug 60 at one side thereof and an aperture 61 formed therein. Through the aperture 61 is inserted a bushing 62 having a roller or pin 63 rotatably mounted therein for the purpose of engaging the cam 35 of the cam disc. The roller 63 is normally pressed toward the cam disc by means of a leaf spring 64 which is secured near one end to the compensating lever by means of rivets 65. The free end of the spring 64 bears against the end of the roller or pin as shown at 66.

The throttle lever is shown in detail in Figures 9 and 10 and is provided with opening 67 for engaging the control lever stud 41. Below this opening the throttle lever is extended and bent outwardly as shown at 68 for the purpose of establishing the correct relation between the throttle lever, the compensating lever and the cam disc. The extension of the throttle lever is also provided with an upwardly extending lug 69 and a coil spring 70 is attached at one end to the lug 69 and at the other end to the lug 58 of the compensating lever in order to permit independent actuation of said throttle lever. The lower terminal of the throttle lever 53 is provided with two apertures 71 and 72 which are adapted to be connected to the throttle valve of the engine and to a corresponding control lever (not shown) in the observer's cockpit of the airplane, as is more fully shown and described in my Patent No. 1,427,830. The lug 60 of the compensating lever is adapted to engage the throttle lever in order to move the same in one direction toward the "off" position in accordance with the location of the cam roller 63 on the cam 35. The coil spring 70 will move the throttle lever in the opposite direction in accordance with the position of the compensating lever as determined by the cam guide 36.

The operating lever 21 is provided with a handle 73 which is pivotally connected thereto by means of a pin 74. The handle carries a spring pressed locking key 75 which is adapted to be operated to released position by means of a push button 76 and a rod 77. The locking key 75, when in locked position, engages transverse recesses 75' formed in the lever 21 and thereby locks the handle in operative position with respect to the lever. When it is desired to fold the handle, it is only necessary to press the button 76 until the locking key is moved out of the registering recesses in the handle and lever whereupon the handle may be turned about the pivot 74 until it is in parallel relation to the lever 21. By making the handle foldable, as above described, more room is afforded in the cockpit when it is desired to operate for some time with a fixed angularity of the propeller blades.

If it is desired to change the angularity of the propeller blades from a normal flying pitch to a reverse pitch, the handle 73 is folded outwardly to operative position and the operating lever is turned in the desired direction. This results in the rotation of the shaft 18, pinion 23, the cam disc 35, and sprocket 29, which actuates the propeller reversing mechanism. The cam roller 63 is in contact with the cam at some point of its contour and, as the cam disc rotates, the cam roller will position the compensating lever 56 in accordance with the contour of the cam. The lug 60 of the compensating lever contacts with the throttle lever and moves the same toward closed position as the propeller approaches the mean pitch adjustment. Continued movement of the handle will move the shaft in the same direction and further change the angularity of the blades from mean pitch to reverse pitch and simultaneously the cam guide acts on the compensating lever which, acting through the spring 70, will tend to move the throttle toward open position. In this way the throttle valve may be automatically controlled in accordance with the angular position of the propeller blades. For safety purposes, the cam 35 is so shaped as to move the throttle valve to idling position for a considerable period before the propeller blades actually pass through the mean position or between the points A and B indicated in Figure 7. The spring 70 also permits the throttle valve to be manually moved at any time to the "off" position when the cam roller is located in the groove between the cam and cam guide. When the roller has passed through the groove and the propeller blades are in full reverse pitch and after the airplane has stopped, the throttle lever is manually swung to "off" position and the roller is moved from the cam by means of the spring 70, as shown in Figure 7.

It is only necessary to reverse the direction of rotation of the handle 73 to bring the blades from full reverse pitch, through mean pitch, to normal flying pitch. Rotation of the cam disc corresponding to this reverse rotation of the handle will cause one or the other of the cam surfaces 38 to engage the cam roller while the latter is in "off" position and direct the same to the inclined surface 37, whereupon continued rotation of the disc will cause the roller to engage this surface 37 and yield against the tension of the spring 64 and ride on cam guide until it registers with the groove between the cam and cam guide, which will occur approximately at the "off" position of the cam when the spring will snap the roller into the groove. The cam surface 38' will direct the roller into the groove between the cam and cam guide in case the roller should become displaced from the cam during the rotation of the shaft 18 in a direction for changing the pitch of the propeller blades from normal flying to full reverse.

When the propeller blades are in normal flying position, the roller is located midway of the circular surface 80 and rotation of the shaft 18 in one direction or the other moves the surface 80 to one side or the other of this middle point. This surface 80 is of sufficient extent to allow the angularity of the blades to be increased or decreased about five degrees depending upon the direction in which the shaft 18 is rotated. When flying at high altitudes without using the supercharger, the angularity of the blades should be decreased while for still higher altitudes the supercharger should be utilized and the angularity of the blades increased. As the surface 80 is concentric with the center of the cam disc, changes in angularity of the propeller blades caused by movements of the shaft 18 within the extent of this surface will not affect the position of the throttle which is open when roller 63 contacts with surface 80.

My invention also utilizes the control bracket 10 for the mounting of a plurality of control levers whereby the same may be readily grasped and manipulated by the pilot and at the same time a compact construction is provided.

It is obvious that those skilled in the art to which this invention appertains may make modifications in the structure herein shown and described without departing from the spirit and scope of my invention as defined in the appended claims.

I claim:

1. A control mechanism for aircraft having a reversible propeller, comprising, in combination, a rotatable shaft, a cam disc rotatably mounted on said shaft, gearing for operating said cam disc from the shaft, a throttle lever, devices adapted to be actuated by the cam of said cam disc for automatically positioning the throttle valve, and means connected to said shaft for changing the angularity of the propeller blades simultaneously with the automatic movements of the throttle valve.

2. A control mechanism for aircraft having a reversible propeller, comprising, in combination, a bracket, a rotatable shaft mounted therein, a cam disc rotatably mounted on said shaft, gearing for operating said cam disc from the shaft, a throttle lever mounted on said bracket, compensating devices adapted to be actuated by the cam of said disc for automatically positioning the throttle valve and means for changing the angularity of the propeller blades including a sprocket wheel secured to said shaft.

3. A control mechanism for aircraft having a reversible propeller, comprising, in combination, a rotatable shaft, a cam disc rotatably mounted on said shaft, gearing operatively connecting said cam disc with the shaft, a throttle lever, devices adapted to be actuated by the cam of said cam disc for automatically positioning the throttle valve, means connected to said shaft for changing the angularity of the propeller blades simultaneously with the automatic movements of the throttle valve, and an operating lever provided with a foldable handle for rotating said shaft.

4. A control mechanism for aircraft having a reversible propeller, comprising, in combination, a rotatable shaft, a disc rotatably mounted on said shaft, a cam carried by said disc, means for rotating said disc from the shaft, a throttle lever, a compensating lever, a spring connecting said levers, a lug on the compensating lever adapted to engage and move said throttle lever, a roller carried by said compensating lever for engaging said cam, and means for changing the angularity of the propeller blades including a sprocket wheel secured to said shaft.

5. A control mechanism for aircraft, comprising, in combination, a rotatable shaft, a disc rotatably mounted on said shaft, a cam and a cam guide carried by said disc in spaced relation, means for rotating said shaft, a compensating lever, a lug on the compensating lever adapted to engage and move said throttle lever, a spring connecting said levers and permitting independent manual actuation of said throttle lever, and a spring pressed roller carried by said compensating lever and adapted to engage said cam, said cam guide having cam surfaces formed thereon for directing the roller against said cam when manually displaced therefrom.

6. In an aircraft having an internal combustion engine and a reversible propeller, a control bracket having a rotatable shaft and a stud mounted therein in spaced relation, a throttle lever mounted on said stud, means connected with said shaft for reversing the angularity of the propeller blades, and co-acting devices between said shaft and throttle lever for automatically actuating the latter in accordance with the angular position of the propeller blades.

7. A control bracket for aircraft having a stud mounted therein, a plurality of control levers pivotally mounted on said stud, friction discs interposed between said levers for yieldingly holding the latter in adjusted position, and devices carried by said discs for limiting the travel of said levers.

In testimony whereof I have affixed my signature.

ERNEST G. McCAULEY.